(12) United States Patent
Van Kempen

(10) Patent No.: US 6,452,771 B1
(45) Date of Patent: Sep. 17, 2002

(54) PROTECTION SYSTEM

(75) Inventor: Paulus Van Kempen, Riel (NL)

(73) Assignee: Thales Nederland B.V., Hengelo (NL)

( * ) Notice: Subject to any disclaimer, the term of this patent is extended or adjusted under 35 U.S.C. 154(b) by 0 days.

(21) Appl. No.: 09/581,167

(22) PCT Filed: Oct. 6, 1999

(86) PCT No.: PCT/EP99/07796

§ 371 (c)(1),
(2), (4) Date: Jun. 13, 2000

(87) PCT Pub. No.: WO00/22500

PCT Pub. Date: Apr. 20, 2000

(30) Foreign Application Priority Data

Oct. 13, 1998 (NO) .............................................. 1010303

(51) Int. Cl.$^7$ ................................................ H02H 3/00
(52) U.S. Cl. ....................... 361/93.1; 361/57; 307/100
(58) Field of Search ............................. 361/93.1, 93.2, 361/93.7, 93.8, 93.9, 57, 58; 307/31, 35, 39, 52, 62, 85, 86, 100, 116, 125, 131; 323/908

(56) References Cited

U.S. PATENT DOCUMENTS 4,575,641 A * 3/1986 Kolpin ....................... 307/100
4,648,015 A * 3/1987 Davis et al. ................... 361/54
5,446,320 A * 8/1995 Scharnberg et al. ......... 307/100
5,691,870 A 11/1997 Gebara ......................... 361/86

FOREIGN PATENT DOCUMENTS

JP        08-329593        12/1996        ........... G11B/19/04

* cited by examiner

Primary Examiner—Ronald W. Leja
(74) Attorney, Agent, or Firm—Oblon, Spivak, McClelland, Maier & Neustadt, P.C.

(57) ABSTRACT

A method and system for detecting a potentially destructive state of an arrangement containing electronics and for terminating the potentially destructive state. In the method and system currents consumed by the electronics through connecting mechanisms from at least one supply voltage are measured. The measured currents are compared with respective stored maximum permissible currents stored in a memory. Further, the connecting mechanisms are disconnected from the at least one supply voltage to thereby ground the arrangement when at least one consumed current is measured as higher than the respective maximum permissible current.

12 Claims, 1 Drawing Sheet

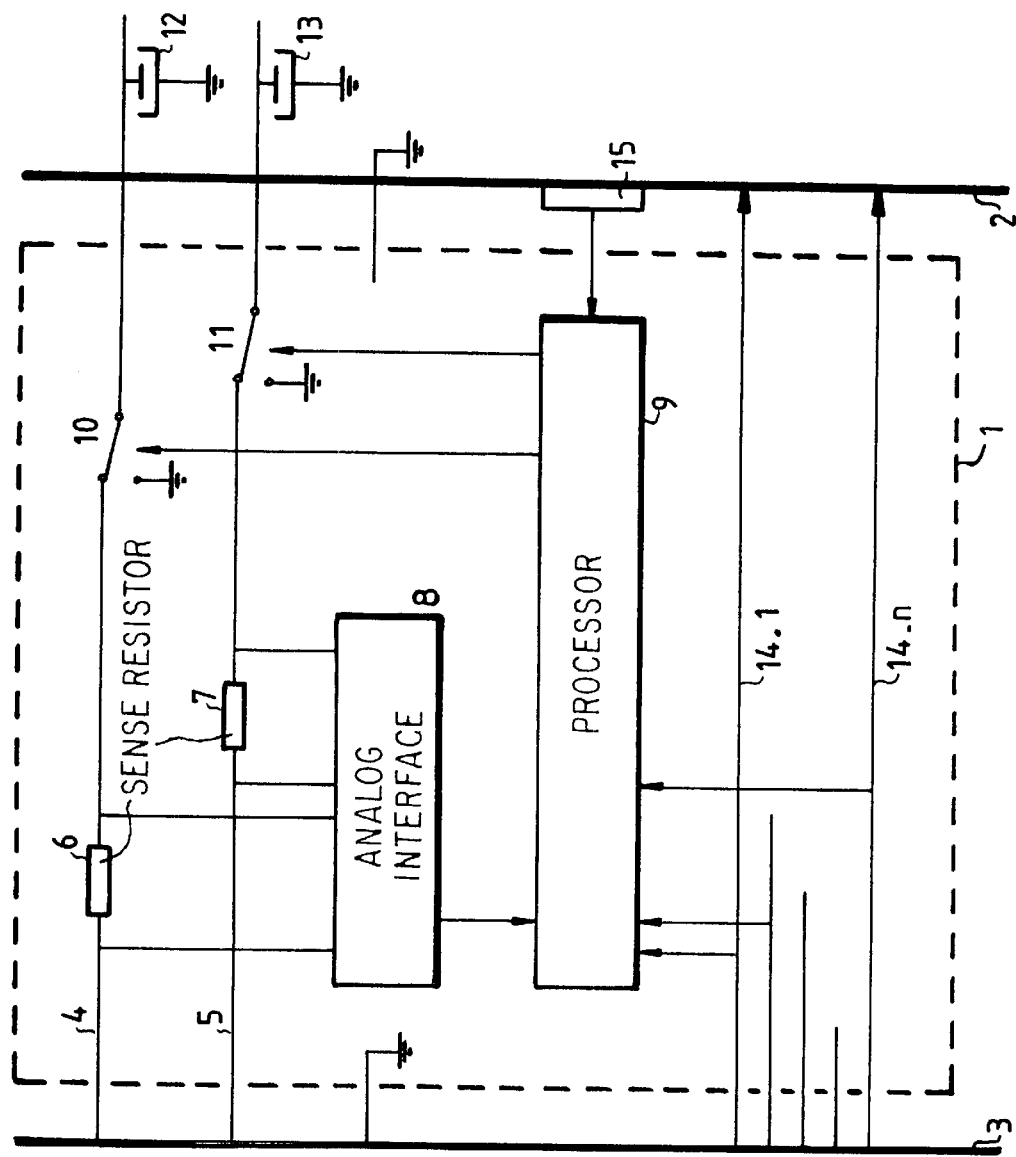

PROTECTION SYSTEM

BACKGROUND OF THE INVENTION

1. Field of the Invention

The invention relates to a method for detecting a potentially destructive state of an-arrangement containing electronics and for terminating this state, whereby currents $I_1, I_2, \ldots, I_n$, consumed by the electronics, via connecting means from at least one supply voltage, are continuously compared with memorized maximum permissible currents $Im_1, Im_2, \ldots, Im_n$, and whereby the connecting means are disconnected from the at least one supply voltage and are subsequently earthed as soon as at least one consumed current $I_j$ is higher than the corresponding maximum permissible current $Im_j$, with $j \in \{1, 2, \ldots, m\}$.

The method is aimed at preventing the breakdown of the electronics which particularly occurs as a result of a latch-up condition known in the art. The occurrence of latch-up causes at least one component contained in the electronics to be reduced to a state, not envisaged in the design or at least not considered possible, where the breakdown of this at least one component is inevitable, which will usually have an adverse effect on the system's operational effectiveness. Latch-up may occur as a result of strong electromagnetic fields, static discharges, highly fluctuating supply voltages or high-energy particles.

2. Discussion of the Background

For professional equipment, designed for e.g. space or military applications, use is preferably made of components which are insusceptible to latch up. However, owing to their prohibitive prices, these components are unsuitable for use in less sophisticated equipment. Particularly for computer equipment, components of the four-layer type, highly susceptible to latch-up, are nearly always used.

Computer equipment has increasing popular appeal and has reached an exceptionally high state of perfection. Consequently, the use of COTS (Commercial-Off-The-Shelf) components even in professional applications is inevitable. There is a risk, however, that professional equipment becomes faulty as a result of latch-up of a component contained in COTS equipment. In space applications, this may occur as a result of solar activity coupled with high radiation levels. Equipment for military applications has to be immune to comparatively nearby nuclear explosions. In less sophisticated applications, latch-up may occur as a result of lightning striking in the proximity of the equipment or by problems encountered with, for instance, a ship or aircraft power supply system.

SUMMARY OF THE INVENTION

Thus, it is an object of the present invention to protect COTS equipment against the effects of latch-up, without modifying this COTS equipment as such.

The invention also relates to a protection system for detecting a potentially destructive state of an arrangement containing electronics and for terminating this state, provided with measuring means for measuring currents consumed in the operating mode by the electronics from at least one supply voltage, memory means for storing the maximum currents permitted by the electronics, a digital processor for continuously comparing consumed currents with corresponding, memorized currents and processor-controlled switching means for disconnecting the electronics from the at least one supply voltage and for subsequently connecting said electronics to earth if at least one consumed current exceeds the corresponding maximum permissible current level stored in the memory means.

For an arrangement to be protected different operating modes can be distinguished. Thus, the arrangement may be in the standby mode or may be fully operational. A favourable realization of the method is characterized in that for each operating mode, a set of maximum permissible currents valid for that particular operating mode is stored in memory.

Measurements show that the currents in the different operating modes generally depend on the ambient temperature in which the arrangement operates. An embodiment according to a further aspect of the invention which also takes account of a fluctuating ambient temperature is characterized in that for a number of ambient temperatures in each operating mode, a set of maximum permissible currents, valid for that particular temperature in that particular operating mode is stored in memory. It is then possible to derive for a particular ambient temperature a maximum permissible current from the maximum permissible currents stored for the most approximate temperatures, for instance on the basis of linear interpolation.

In changing over from a first mode to a second mode, certain currents may fluctuate in a time-dependent manner. More precisely, the current will, when activating a certain function, initially reach a peak level, for instance caused by the spin up of a motor or stepping of a stepping motor. A favourable realization of the method is thereto characterized in that these currents are stored in a time-dependent manner in the set of memorized maximum permissible currents.

The sets of maximum permissible currents are preferably determined for each separate device, since the statistical spread in the current consumption of electronic components, and consequently the spread in the current consumption of each separate device, may be considerable. A favourable method according to a further aspect of the invention which realizes this in a simple manner, is characterized in that in a preoperational phase, the consumed currents $I_1, I_2, \ldots, I_n$ are determined for the different ambient temperatures and operating modes and that the maximum permissible values $Im_1, Im_2, \ldots, Im_n$ are derived from the values $I_1, I_2, \ldots, I_n$, by multiplying these values by a factor. In a favourable realization, the factor is selected in the 1.05–1.2 interval.

In a favourable embodiment according to a further aspect of the invention, the protection system is characterized in that the arrangement distinguishes a number of different operating modes, that the memory means are designed to store, in each operating mode, a set of maximum permissible currents for a number of temperature ranges and that the processor is designed to compare, for each operating mode and each temperature range, the consumed currents with the corresponding set of maximum permissible currents.

A favourable embodiment according to a further aspect of the invention in which the sets of maximum permissible currents are obtained semi-automatically, is characterized in that the processor is also designed to determine, in a preoperational phase, the currents consumed per operating mode and per temperature range, these processor computations serving to determine the maximum permissible currents, and to store these maximum permissible currents in the memory means.

BRIEF DESCRIPTION OF THE DRAWING

The figure schematically shows an embodiment of the present invention.

DESCRIPTION OF THE PREFERRED EMBODIMENT

The invention will now be explained in greater detail with reference to the figure, which schematically shows an arrangement 1 for preventing damage caused by latch-up of an arrangement 2, which arrangement 2 is connected to a host 3. Host 3 may be a military installation or a satellite and is usually designed such. that latch-up is precluded. Arrangement 2, in this embodiment a hard disk, is however susceptible to latch-up owing to the incorporation of low-cost semiconductors. The occurrence of latch-up can be detected through a sudden increase of at least one supply current drawn by arrangement 2. For the purpose of latch-up detection, the +5V power supply line 4 and the +12V power supply line 5 are according to the invention provided with sense resistors 6, 7, which sense resistors are connected to an analog interface 8, incorporating two differential amplifiers and two A/D convertors for converting, in a manner known in the art, the consumed currents to digital signals to be processed by a digital processor 9. Processor 9 can connect arrangement 2 via switches 10, 11 to the +5V and +12V power supply lines 4, 5 or may serve to earth arrangement 2, resulting in the discharge of smoothing capacitors 12, 13 incorporated in arrangement 2. According to the invention, discharge takes place upon latch-up detection, because the energy stored in the smoothing capacitors 12, 13 may be sufficient to destroy the semiconductor affected by latch-up.

In order to ascertain the occurrence of latch-up, processor 9 continuously compares the consumed currents digitized with the aid of analog interface 8 with currents stored in a memory contained in processor 9. In the event of latch-up, the switches 10, 11 are immediately restored to the earthing position whereupon, for instance after five seconds, the +5V and +12V supply voltages are reconnected.

Generally, arrangement 2 may enter various operational states. Assuming a hard disk, we distinguish for instance the spin up of the disk during activation, transfer of data between arrangement 2 and host 3, stepping to another cylinder, data reading and writing, and an idle state.

The transition from one state to another is effected by a command to arrangement 2 to be issued via a set of command 35 lines $14_1, \ldots, 14_n$, which command lines are also read by processor 9. A change in one of the command lines results in an interrupt of processor 9. In a preoperational phase, the current drawn from the +5V and the +12V power supply lines is after each interrupt measured for a certain period of time and subsequently stored in the memory of processor 9, in combination with the logic levels of the command lines $14_1, \ldots, 14_n$, and the change that caused the interrupt. More precisely, it is not the measurement that is retained but the maximum of both the actual measurement and of previous measurements carried out as a result of that same change. In fact, for each change exactly one measurement is retained to represent the change-engendered peak currents as a function of time.

Once these peak currents have been determined in a preoperational phase, the peak values are multiplied by a safety factor to obtain threshold values. In an operational phase, the protection circuitry will then be actuated if the actual current drawn from the +5V or the +12V power supplies exceeds said threshold values.

The safety factor is preferably selected to be small so as to increase the chance of timely latch-up detection. A too small safety factor would increase the liability to false alarm and would consequently entail an unnecessary disconnection of arrangement 2. For a certain application, the safety factor is preferably determined experimentally by measuring the false alarm probability for various safety factors and by choosing a compromise value. This compromise value will usually be 1.1.

The currents drawn by some COTS equipment units are found to fluctuate in accordance with the ambient temperature. In such cases, a temperature sensor 15 can be mounted on the COTS unit, an NTC resistor for instance, so that the consumed currents can in a preoperational phase be determined for a number of temperatures. This way, a set of maximum permissible currents can be determined for each temperature. In the operational phase, this then constitutes the basis for determining the actually measured maximum permissible currents, for instance through linear interpolation between the stored values obtained for the most approximate temperatures.

Generally, a COTS unit will nearly always be in one certain position, for instance an idle position at room temperature. It may then be recommendable to provide arrangement 1 with a test switch for artificially increasing a certain supply current, by for instance 10% Thus, the proper functioning of the arrangement can be periodically checked.

What is claimed is:

1. A method for detecting a potentially destructive state of an arrangement containing electronics and for terminating the potentially destructive state, comprising:

measuring currents consumed by the electronics through connecting mechanisms from at least one supply voltage;

comparing the measured currents with respective stored maximum permissible currents stored in a memory; and disconnecting the connecting mechanisms from the at least one supply voltage to ground the arrangement when at least one consumed current is measured as higher than the respective maximum permissible current.

2. A method as claimed in claim 1, wherein different operating modes can be distinguished for the arrangement, and for each operating mode a set of maximum permissible currents valid for that particular operating mode is stored in the memory.

3. A method as claimed in claim 2, wherein for a number of ambient temperatures in each operating mode a set of maximum permissible currents, valid for a respective temperature in a respective operating mode, is stored in the memory.

4. A method as claimed in claim 3, wherein the set of maximum permissible currents are stored in a time-dependent manner.

5. A method as claimed in claim 3, wherein in a preoperational phase the consumed currents are determined for different ambient temperatures and maximum permissible values are derived from the consumed current by multiplying the consumed currents by a factor.

6. A method as claimed in claim 5, wherein the factor is chosen in an interval of 1.05–1.2.

7. A protection system for detecting a potentially destructive state of an arrangement containing electronics and for terminating the potentially destructive state, comprising:

a measuring mechanism configured to measure currents consumed in an operating mode by the electronics from at least one supply voltage;

a memory configured to store maximum currents permitted by the electronics;

a digital processor configured to compare consumed currents with corresponding of the stored currents; and processor-controlled switches configured to disconnect the electronics from the at least one supply voltage and to connect the electronics to ground if at least one consumed current exceeds the corresponding maximum current stored in the memory.

8. A protection system as claimed in claim 7, wherein the arrangement distinguishes a number of different operating modes that the memory is configured to store, and in each operating mode a set of maximum permissible currents corresponds to a number of temperature ranges, and the processor is further configured to compare, for each operating mode and each temperature range, the consumed currents with the corresponding set of maximum permissible currents.

9. A protection system as claimed in claim 8, wherein the processor is further designed to determine, in a preoperational phase, currents consumed in respective operating modes and at respective temperature ranges, to determine the maximum permissible currents, and to store the determined maximum permissible currents in the memory.

10. A protection system for detecting a potentially destructive state of an arrangement containing electronics and for terminating the potentially destructive state, comprising:

measuring means for measuring currents consumed in an operating mode by the electronics from at least one supply voltage;

memory means for storing maximum currents permitted by the electronics;

digital processor means for continuously comparing consumed currents with corresponding of the stored currents; and processor-controlled switching means for disconnecting the electronics from the at least one supply voltage and for connecting the electronics to ground if at least one consumed current exceeds the corresponding maximum current level stored in the memory means.

11. A protection system as claimed in claim 10, wherein the arrangement distinguishes a number of different operating modes that the memory means is designed to store, and in each operating mode a set of maximum permissible currents corresponds to a number of temperature ranges, and the processor means further compares, for each operating mode and each temperature range, the consumed currents with the corresponding set of maximum permissible currents.

12. A protection system as claimed in claim 11, wherein the processor means further determines, in a preoperational phase, currents consumed in respective operating modes and at respective temperature ranges, to determine the maximum permissible currents, and stores the determined maximum permissible currents in the memory means.

* * * * *

UNITED STATES PATENT AND TRADEMARK OFFICE
CERTIFICATE OF CORRECTION

PATENT NO. : 6,452,771 B1 Page 1 of 1
DATED : September 17, 2002
INVENTOR(S) : Van Kempen It is certified that error appears in the above-identified patent and that said Letters Patent is hereby corrected as shown below:

<u>Title page,</u>
Item [30], Foreign Application Priority Data should read:

-- [30]      Foreign Application Priority Data

Oct. 13, 1998 (NL) .................................. 1010303 --

Signed and Sealed this

Twenty-first Day of January, 2003

JAMES E. ROGAN
*Director of the United States Patent and Trademark Office*